United States Patent Office 2,811,854
Patented Nov. 5, 1957

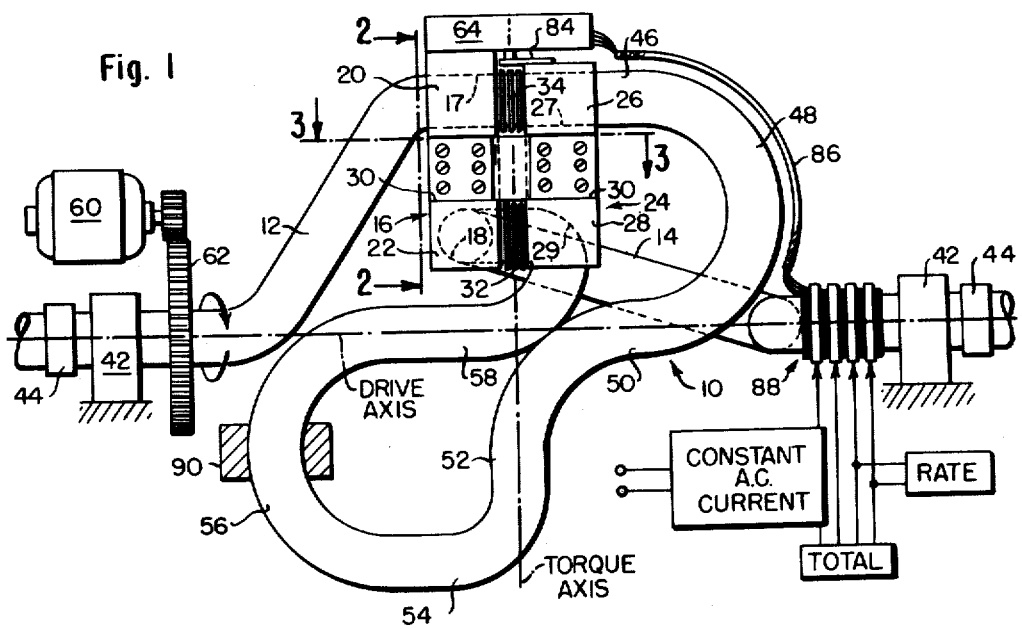
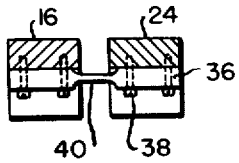
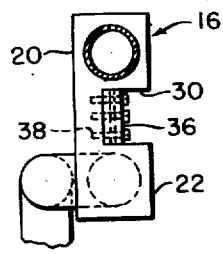
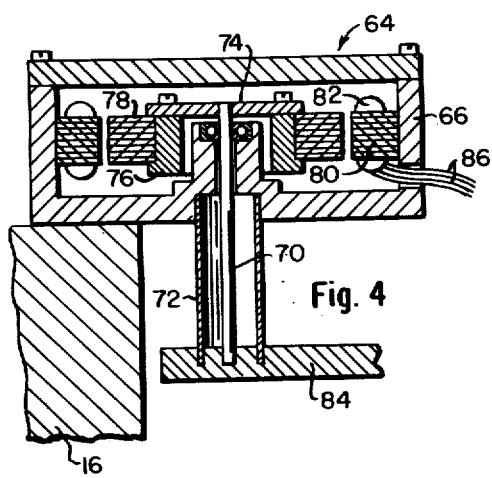
Nov. 5, 1957    H. A. POWERS    2,811,854
LOW DEFLECTION MASS FLOWMETER
Filed July 14, 1955
INVENTOR.
HOWARD A. POWERS
BY
Kenway, Jenney, Witter & Hildreth
ATTORNEYS

2,811,854

LOW DEFLECTION MASS FLOWMETER

Howard A. Powers, Medfield, Mass., assignor, by mesne assignments, to Detroit Controls Corporation, Detroit, Mich., a corporation of Michigan Application July 14, 1955, Serial No. 522,061

10 Claims. (Cl. 73—194)

This invention relates to flowmeters and comprises a new and improved gyroscopic mass flowmeter of the type disclosed in copending application Ser. No. 454,485, of Altfillisch et al., filed September 7, 1954.

A gyroscopic mass flowmeter in general comprises essentially a curved conduit which directs the fluid to be measured through a generally circular path. Rotation imparted to the curved conduit about an axis transverse to the axis of the fluid path causes the fluid to exert a torque on the conduit about a third axis normal to the other two axes. The torque exerted by the fluid on the conduit is a function of the mass flow rate of the fluid passing through the conduit and is produced by the gyroscopic couple of the fluid flowing in the rotating curved conduit. In the gyroscopic mass flowmeter of this invention, the curved conduit is allowed to deflect about the third axis in response to the torque, and the deflection is measured directly.

When the conduit is thus permitted to deflect, the centrifugal force developed as the conduit rotates, introduces errors into the measurement of mass flow rate, unless these forces are balanced about the axis of deflection (torque axis), either adding to or subtracting from the deflection of the conduit caused by the gyroscopic torques. Because the developed centrifugal forces are a function of the density of the fluid in the meter, they may render the meter density sensitive.

A primary object of this invention is to provide a gyroscopic flowmeter in which the centrifugal force developed as the conduit rotates is maintained at a negligible amount.

A further object of this invention is to simplify the configuration of the sensing conduits of gyroscopic flowmeters.

Another important object of this invention is to reduce the pressure drop of the fluids flowing through gyroscopic mass flowmeters.

According to this invention, my flowmeter includes a sensing conduit mounted for rotation about a drive axis and formed to yield a gyroscopic couple from a fluid flowing therein. Flexible coupling means connected to the ends of the sensing conduit permit deflection of the conduit while the fluid is flowed through it, the fluid being led therethrough by appropriate inlet and outlet ducts. An important feature of the invention resides in yielding means forming a flexure pivot connecting with the conduit to limit its deflection to a maximum of ¼ degree under full flow conditions. By limiting the deflection of the conduit to a maximum of ¼ degree, the magnitude of the torque about the torque axis developed by the centrifugal forces is negligible.

A number of advantages are acquired by employing a flowmeter constructed in accordance with my invention. In particular, the sensing conduit may be of simple configuration and may thus be formed of large diameter pipe without increasing the overall size of the meter. The use of large diameter pipe and the elimination of a number of bends in the flow path substantially reduce the pressure drop of the fluid. As a result, many industries which heretofore have been unable to use gyroscopic mass flowmeters because of the drop in pressure of the fluid measured, now are potential customers. Furthermore, by simplifying the construction of the meter, the cost of manufacture is reduced appreciably. The simplified configuration of my meter has still another advantage, i. e. it can easily and readily be disassembled and cleaned to meet the highest standards of sanitation, thus further increasing the general utility of the meter.

These and other objects and features of my invention along with incident advantages will be better understood and appreciated from the following detailed description of one embodiment thereof selected for purposes of illustration and shown in the accompanying drawing in which:

Fig. 1 is a side view of a flowmeter constructed in accordance with this invention.

Fig. 2 is a sectional view of a portion of the meter illustrated in Fig. 1, taken along the corresponding sight lines 2—2 in that figure.

Fig. 3 is a view in section of the assembly shown in Fig. 2, taken along the corresponding section lines 3—3 in Fig. 1, and Fig. 4 is a detail view in section of the instrument employed to measure the deflection of the sensing conduit of the flowmeter shown in Fig. 1.

The flowmeter comprising my invention includes in its general organization a sensing conduit 10 and an inlet and an outlet conduit 12 and 14 respectively. A rigid member or block 16 interconnects the ends of the inlet and the outlet conduits 12 and 14 communicating with the sensing conduit 10, and a similar block 24 interconnects the ends of the sensing conduit.

The blocks 16 and 24 are closely spaced in parallel relationship. A passage 17 cut through one end 20 of the block 16 registers with the discharge end of the inlet conduit 12, and a passage 27 formed in the corresponding end 26 of the block 24 receives the inlet end of the sensing conduit 10. A bellows 34 extends between the blocks and interconnects the passages 17 and 27.

A passage 18 formed in the other end 22 of the block 16 receives the inlet end of the outlet conduit 14. The discharge end of the sensing conduit communicates with a passage 29 formed in the corresponding end 28 of the block 24, and a bellows 32 disposed parallel to the bellows 34 in the gap between the blocks interconnects the passages 18 and 29.

If we assume that the inlet and outlet conduits 12 and 14 are rigidly supported, in the absence of other structure the sensing conduit 10 may deflect relative to the inlet and outlet conduits, for the bellows afford substantially no stability to the assembly. A force applied to the sensing conduit 10 and having a direction perpendicular to the plane of the paper causes the sensing conduit to displace angularly about an axis perpendicular to and intersecting the axes of the bellows 32 and 34. That axis is legended "Torque Axis" in the drawing.

Recesses 30 are cut into each of the blocks 16 and 24 and receive a flexure pivot 36 secured in position by a number of screws 38. The central portion 40 of the pivot 36 is reduced in thickness and lies on the torque axis. The flexure pivot 36 is of substantial width and rigidifies the assembly against forces applied to the sensing conduit 10 in the plane of the paper. However, the thin central portion 40 of the flexure pivot 36 allows limited deflection of the sensing conduit about the torque axis. For reasons to be set forth later, that deflection does not exceed ¼ degree.

The assembly thus far described is supported for rotation by a pair of blocks 42 which engage the inlet and outlet conduits 12 and 14. The axis of rotation of the assembly is coincident with the axes of the portions of the conduits 12 and 14 engaged by the blocks 42. The rotational axis bears the legend "Drive Axis" in the drawing. Rotation is imparted to the meter by a constant speed motor 60 which drives a gear 62 carried on the inlet conduit 12.

The path of the fluid and the forces exerted by the fluid as it passes through the sensing conduit will now be analyzed. As the fluid enters the meter along the drive axis it is caught up in the rotating inlet conduit 12 and moves radially outward through that conduit. When the fluid reaches the outer radial limit of the inlet conduit 12 it turns into a path parallel to the drive axis and defined by the passage 17, the bellows 34, the passage 27 and a horizontal portion 46 of the sensing conduit 10. The fluid then flows inwardly toward the drive axis through a leg 48 of the sensing conduit and its angular momentum changes. The change of angular momentum exerts a force on the leg 48, which is part of a gyroscopic couple produced about the torque axis.

The fluid leaving the leg 48 of the sensing conduit 10 turns into another leg 50 substantially coaxial with the drive axis. The fluid next enters a radial leg 52 of the sensing conduit 10 and once again its angular momentum changes, causing a force to be exerted on that leg. However, the resulting force is tangential to the drive axis, radiates from the torque axis and, therefore, cannot exert a torque about that axis. Next the fluid enters a leg 54 parallel to the drive axis, and upon leaving that leg it enters a leg 56 of the sensing conduit 10 and flows inwardly toward the drive axis. The leg 56, similar to the leg 48, produces another change in the angular momentum of the fluid causing a force to be exerted on the leg 56. The forces produced by the fluid in the legs 48 and 56 cooperate to produce a couple about the torque axis.

Before leaving the sensing conduit 10, the fluid flows through a leg 58 substantially coaxial with the drive axis. Having passed through the sensing conduit 10, the fluid is returned to its line (not shown) by the passage 29 in the block 24, the bellows 32, the passage 18 in the block 16, and the outlet conduit 14.

From the foregoing description of the sensing conduit 10, it is clear that the fluid flowing in the legs 48 and 56 produces a couple about the torque axis. If the motor drives the sensing conduit at a constant speed about the drive axis, that couple is directly proportional to the weight rate of flow of the fluid in the meter. In response to the couple the sensing conduit 10 deflects about the torque axis an angular distance proportional to the magnitude of the couple. To measure the deflection, I employ a dynamo transformer 64.

The transformer 64 comprises a casing 66 directly mounted on the block 16. One end of a lever 84 is mounted on the block 24 which is fixed to and deflects with the sensing conduit 10. A motion transfer pin 70 connected to the other end of the lever 84 extends upwardly along the torque axis through the transformer casing 66. A plate 74 within the casing 66 is mounted on the end of the pin 70, and carries a hub 76 and a transformer rotor 78. A transformer stator 80 secured to the casing 66 surrounds the rotor. The rotor 78 in the embodiment illustrated is free of windings while the stator 80 carries a pick-up and an exciting winding collectively designated by the numeral 82. The rotor 78 moves relative to the stator 80 in response to turning of the motion transfer pin 70 under the influence of the lever 84 connected to the sensing conduit 10. The relative movement of the rotor induces a signal in the pick-up winding of a magnitude directly proportional to the deflection of the sensing conduit.

A torque tube 72 surrounds the motion transfer pin 70 and connects the fixed transformer casing 66 with the lever 84. The torque tube 72 cooperates with the flexure pivot 36 to oppose deflection of the sensing conduit. The flexure pivot 36 and torque tube 72 are designed to limit the deflection to ¼ degree under full flow conditions. It is appreciated that the torque tube 72 may be eliminated if the flexure pivot 36 is sufficiently rigid to accomplish that function alone.

Continuing with the description of the means employed to measure the deflection of the sensing conduit 10, a cable 86 containing wires to energize the transformer 64 and carry the output signal induced in the pick-up windings is connected to a four wire slip ring assembly 88 mounted on the outlet conduit 14. The pair of energizing wires are connected directly to a constant A. C. current source. To determine the weight rate of flow through the sensing conduit, I connect a linear scale voltmeter specially calibrated in pounds or slugs per second to the second pair of wires. A watt-hour meter connected in parallel with the rate meter and energized from the source of constant A. C. current will, if properly calibrated in pounds or slugs, record the total mass flow. Those instruments are represented in Fig. 1 by the appropriately labeled blocks.

A pair of slip couplings 44 carried on the ends of the inlet and the outlet conduits 12 and 14 connect the flowmeter into a line (not shown) carrying fluid to be measured. In operation, the motor 60 through the gear 62 rotates the inlet, sensing, and outlet conduits about the drive axis established by the supports 42. In reaction to the gyroscopic couple produced by the changing angular momentum of the fluid flowing in the legs 48 and 56 of the sensing conduit 10, the sensing conduit deflects about the torque axis. A weight 90 mounted on the leg 56 balances the sensing conduit 10, the block 24, and their contents about the torque axis lie in other than a vertical plane. In response to of the gravitational force when the conduit and torque axis lies in other than a vertical plane. In response to the deflection of the sensing conduit 10, a signal is produced by the dynamo transformer 64 directly proportional to the mass flow rate of the fluid. The rate meter connected to transformer 64 measures the signal and indicates the instantaneous mass rate of flow. The second meter connected in parallel with the rate meter integrates with respect to time the signal produced by the transformer 64 and records the total mass flow.

A number of advantages, not wholly apparent from the above description, are acquired by the use of a flowmeter constructed in accordance with my invention. Of particular importance are the benefits acquired by employing the bellows 32 and 34 with the flexure pivot 36. The flexure pivot 36 which defines the torque axis reacts to deflection of the sensing conduit in the same manner as the bellows 32 and 34, i. e. the reduced mid-section 40 of the pivot assumes a curvature substantially identical to the curvature of the axes of the bellows. Therefore, the torque axis intersects the axes of the bellows throughout the measuring operation, and the pressures exerted against the walls of the bellows are balanced about the torque axis. If the flexure pivot 36 did not react to the deflection of the sensing conduit in this manner, deflection of the bellows 32 and 34 would move the bellows axes to one side of the torque axis. As a result, the fluid pressure exerted on the bellows would produce a torque about the torque axis either adding to or subtracting from the displacement of the sensing conduit in reaction to the gyroscopic couple, thus causing the meter to be pressure-sensitive. In addition to eliminating pressure-sensitivity, the pivot 36 prevents stretching of the bellows 32 and 34 in response to the fluid pressure and, thus precludes translational movement of the sensing conduit 10 along the drive axis.

It has been stated that the deflection of the sensing conduit about the torque axis is limited to a maximum of ¼ degree under full flow conditions. This is necessary to eliminate density-sensitivity. The full significance of displacement as it affects the accuracy of the meter will now be explained in detail. The pick-up coils of the transformer 64 produce a signal directly proportional to the displacement of the sensing conduit about the torque axis. That displacement is proportional to the total torque exerted on the sensing conduit about that axis. The centrifugal force produced by the rotation of the sensing conduit 10 about the drive axis creates a torque about the torque axis when the sensing conduit deflects.

The centrifugal torque about the torque axis may be defined mathematically by the following equation:

$$T\ centrifugal = 2MR^2\theta\Omega^2$$

where M is one-half the total mass of the sensing conduit and its contents, R is the effective radius of the mass about the torque axis, $\theta$ is the angular deflection, in radians, of the sensing conduit about the torque axis in response to the gyroscopic couple, and $\Omega$ is the rotational velocity of the mass about the drive axis. While it is impossible to reduce appreciably the M. R. and $\Omega$ factors in the above equation without seriously limiting the capacity of the meter, the $\theta$ factor may be reduced without affecting its capacity. By limiting the deflection to a maximum of ¼ degree the magnitude of the centrifugal torque is negligible; thus the displacement of the sensing conduit about the torque axis is directly proportional to the gyroscopic couple, and density sensitivity is eliminated.

Still another important advantage is acquired by employing a flowmeter constructed in accordance with my invention. Because the flow path defined by the inlet, outlet, and sensing conduits is unencumbered by a number of sharp turns, relatively large diameter pipe may be employed to form the meter. These features substantially reduce the pressure drop of the fluid passing through the meter. As a result, the meter may be used in a number of operations which cannot tolerate appreciable pressure drops in the fluid to be measured.

Having thus described in great detail one embodiment of my invention, numerous modifications and equivalent substitutions will occur to those skilled in the art. Therefore, it is not my intention to limit the scope of this invention to the embodiment illustrated and described, but to the appended claims.

What I claim as new and desire to secure by Letters Patent of the United States is:

1. In a flowmeter having a curved conduit, inlet and outlet ducts for directing fluid to be measured through the curved conduit, means for supporting said ducts and said conduit, means for imparting to the conduit and ducts angular movement about an axis transverse to an axis about which there exists angular momentum of the fluid flowing through the conduit, and means sensitive to deflection of the conduit in response to gyroscopic couples of the conduit transverse to the axis of movement of said conduit; an assembly comprising a pair of parallel bellows interconnecting the inlet and outlet ducts with the conduit and intersecting the axis of deflection of the conduit, said bellows providing fluid communication between the ducts and conduit and a flexure pivot connected to the ducts and the conduit resiliently limiting angular deflection of the sensing conduit in response to gyroscopic couples.

2. In a flowmeter having a curved conduit, inlet and outlet ducts for directing fluid to be measured through the curved conduit, means for supporting said ducts and said conduit, means for imparting to the conduit and ducts angular movement about an axis transverse to an axis about which there exists angular momentum of the fluid flowing through the conduit, and means sensitive to deflection of the conduit in response to gyroscopic couples of the conduit transverse to the axis of movement of said conduit; an assembly comprising a rigid member interconnecting the ends of the curved conduit, a second rigid member interconnecting the ends of the ducts communicating with the conduit, a pair of bellows connected to the rigid members and providing fluid communication between the ducts and the conduit, said bellows intersecting the axis of deflection of the conduit, and a member connected to each of the rigid members for resiliently limiting deflection of the conduit in response to gyroscopic couples.

3. In a flowmeter having a curved conduit, inlet and outlet ducts for directing fluid to be measured through the curved conduit, means for supporting said ducts and said conduit, means for imparting to the conduit and ducts angular movement about an axis transverse to an axis about which there exists angular momentum of the fluid flowing through the conduit, and means sensitive to deflection of the conduit in response to gyroscopic couples of the conduit transverse to the axis of movement of said conduit; an assembly comprising a rigid member connected to the conduit, a second rigid member connected to at least one of the ducts, a pair of bellows providing communication between the inlet and the outlet ducts and the conduit, said bellows being perpendicular to and intersecting the axis of deflection of the conduit, and means connected to each of the rigid members for resiliently limiting deflection of the sensing conduit in response to gyroscopic couples.

4. In a flowmeter having a curved conduit, inlet and outlet ducts for directing fluid to be measured through the curved conduit, means for supporting said ducts and said conduit, means for imparting to the conduit and ducts angular movement about an axis transverse to an axis about which there exists angular momentum of the fluid flowing through the conduit, and means sensitive to deflection of the conduit in response to gyroscopic couples of the conduit transverse to the axis of movement of said conduit; an assembly comprising a rigid member connected to the ends of the conduit, a second rigid member connected to the ends of the ducts communicating with the conduit, a pair of bellows interconnecting the ducts and the conduit permitting fluid communication therebetween and deflection of the sensing conduit in response to gyroscopic couples, and means including a flexure pivot connected to each of the rigid members for resiliently limiting deflection of the sensing conduit in response to gyroscopic couples to ¼ degree with maximum flow through the conduit.

5. A flowmeter comprising a curved conduit, inlet and outlet ducts for leading fluid to and from the conduit, means for supporting the conduit and ducts, means for imparting to the conduit and ducts angular movement about an axis transverse to an axis about which there exists angular momentum of the fluid flowing through the conduit, flexible means interconnecting the ducts and the conduit permitting fluid communication therebetween and deflection of the conduit about an axis transverse to the axis of movement of the conduit in response to gyroscopic couples of the conduit, a flexure pivot connected to the ducts and the conduit and across the flexible means resiliently limiting deflection of the conduit in response to gyroscopic couples, and indicating means responsive to deflection of the conduit.

6. A flowmeter comprising a curved conduit, inlet and outlet ducts for leading fluid to and from the conduit, means for supporting said ducts and conduit, means for imparting to the conduit and ducts angular movement about an axis transverse to an axis about which there exists angular momentum of the fluid flowing through the conduit, bellows providing fluid communication between the ducts and the conduit and permitting angular deflection of the conduit in response to gyroscopic couples about an axis transverse to the axis of movement of the conduit, resilient means connecting the ducts and the conduit limiting angular deflection of the conduit in response to the gyroscopic couples to ¼ degree, and indicating means responsive to deflection of the conduit.

7. A flowmeter comprising a curved conduit, inlet and outlet ducts for leading fluid to and from the conduit, means for supporting said conduit and ducts, means for imparting to the conduit and ducts angular movement about an axis transverse to an axis about which there exists angular momentum of the fluid flowing through the conduit, a rigid member interconnecting the ends of the conduit, a second rigid member interconnecting the ends of the ducts communicating with the conduit, a pair of bellows providing fluid communication between the ducts and the conduit and permitting angular deflection of the conduit in response to gyroscopic couples about and transverse to the axis of movement of said conduit, resilient means connecting the rigid members together and limiting angular deflection of the conduit in response to the gyroscopic couples, and means mounted on the rigid members responsive to deflection of the conduit for producing a signal, which is a function of the mass flow through the conduit.

8. In a flowmeter having a curved conduit, inlet and outlet ducts for directing fluid to be measured through the curved conduit, means for supporting said conduit and ducts, means for imparting to the conduit and to the ducts angular movement about an axis transverse to an axis about which there exists angular momentum of the fluid flowing through the conduit, and means sensitive to deflection of the conduit in response to gyroscopic couples of the conduit transverse to the axis of movement of said conduit; an assembly comprising a pair of parallel bellows providing fluid communication and interconnecting the inlet and outlet ducts with the conduit and intersecting the axis of deflection of the conduit, and a flexure pivot connected to the ducts and the conduit precluding translational movement of the sensing conduit along the axis of angular movement.

9. A flowmeter comprising a curved conduit, inlet and outlet ducts for leading fluid to and from the conduit, means for supporting said conduit and ducts, means for imparting to the conduit and ducts angular movement about an axis transverse to an axis about which there exists angular momentum of the fluid flowing through the conduit, flexible means providing fluid communication between the ducts and conduit, and interconnecting the ducts and the conduit permitting deflection of the conduit about an axis transverse to the axis of movement of the conduit in response to gyroscopic couples of the conduit, a flexure pivot connecting the ducts and the conduit resiliently limiting deflection of the conduit in response to gyroscopic couples and precluding translational movement of the conduit along the axis of angular movement, and indicating means responsive to deflection of the conduit.

10. A flowmeter comprising a conduit mounted for rotation about a drive axis, means for rotating said conduit about said drive axis, said conduit being formed to effect a gyroscopic couple as a result of rotation of said conduit about said drive axis and the flow of fluid in said conduit, flexible coupling means providing inlet and outlet connections to said conduit located substantially on the axis of said couple, inlet and outlet means providing fluid communication with and connecting with the ends of said conduit through said flexible coupling means, resiliently yielding means connected to the conduit limiting the deflection of said conduit in response to said gyroscopic couple, and indicating means responsive to deflection of said conduit.

References Cited in the file of this patent

UNITED STATES PATENTS 2,624,198  Pearson _____ Jan. 6, 1953

UNITED STATES PATENT OFFICE

CERTIFICATE OF CORRECTION

Patent No. 2,811,854                                              November 5, 1957

Howard A. Powers

It is hereby certified that error appears in the printed specification of the above numbered patent requiring correction and that the said Letters Patent should read as corrected below.

Column 4, line 33, after the word "axis" insert -- to avoid additional deflection under the influence of the gravitational force when the conduit and torque axis --; lines 33 to 35, strike out "In response to of the gravitational force when the conduit and torque axis lies in other than a vertical plane. --.

Signed and sealed this 17th day of December 1957.

(SEAL)
Attest:
KARL H. AXLINE

Attesting Officer

ROBERT C. WATSON
Commissioner of Patents